United States Patent
Wang et al.

(10) Patent No.: US 11,683,712 B2
(45) Date of Patent: Jun. 20, 2023

(54) HYBRID HIERARCHICAL PARAMETER TRACKING FOR CSI ESTIMATION

(71) Applicant: Samsung Electronics Co., Ltd., Suwon-si (KR)

(72) Inventors: Rui Wang, Fremont, CA (US); Yang Li, Plano, TX (US); Junmo Sung, Allen, TX (US); Yeqing Hu, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/348,621

(22) Filed: Jun. 15, 2021

(65) Prior Publication Data

US 2022/0022079 A1 Jan. 20, 2022

Related U.S. Application Data

(60) Provisional application No. 63/170,278, filed on Apr. 2, 2021, provisional application No. 63/161,695, filed
(Continued)

(51) Int. Cl.
*H04W 24/10* (2009.01)
*H04L 5/00* (2006.01)
*H04B 17/373* (2015.01)

(52) U.S. Cl.
CPC .......... *H04W 24/10* (2013.01); *H04B 17/373* (2015.01); *H04L 5/0053* (2013.01)

(58) Field of Classification Search
CPC ..... H04W 24/10; H04B 17/373; H04L 5/0053
See application file for complete search history.

(56) References Cited

U.S. PATENT DOCUMENTS 10,389,504 B2  8/2019  Soriaga et al.
10,868,605 B2  12/2020  Wang et al.
(Continued)

FOREIGN PATENT DOCUMENTS

EP    3017572 B1    12/2017
WO    2007032715 A1    3/2007
WO    2020074659 A1    4/2020

OTHER PUBLICATIONS

Gifford, S., et al., "Adaptive and Linear Prediction Channel Tracking Algorithms for Mobile OFDM-MIMO Applications", 2005 IEEE Military Communications Conference, Oct. 17-20, 2005, 5 pages.
(Continued)

*Primary Examiner* — Ronald B Abelson

(57) ABSTRACT

Methods and apparatuses for hybrid hierarchical parameter tracking for CSI estimation in a wireless communication system. The methods and apparatuses include receiving uplink signals comprising a channel state information (CSI) report or a sounding reference signal (SRS); performing a channel parameter tracking operation to determine channel parameters that change less than a first threshold amount based on the received uplink signals; performing a channel parameter prediction operation to determine the channel parameters that change greater than a second threshold amount on an output of the channel parameter tracking operation; and performing a channel prediction operation for downlink channels based on an output of the channel parameter tracking operation and the channel parameter prediction operation.

20 Claims, 11 Drawing Sheets

Related U.S. Application Data on Mar. 16, 2021, provisional application No. 63/119,426, filed on Nov. 30, 2020, provisional application No. 63/053,463, filed on Jul. 17, 2020.

(56) References Cited

U.S. PATENT DOCUMENTS

| | | |
|---|---|---|
| 2014/0254421 A1 | 9/2014 | Ahlander et al. |
| 2018/0242285 A1 | 8/2018 | Yoo et al. |
| 2018/0302213 A1 | 10/2018 | Bose et al. |
| 2020/0351046 A1 | 11/2020 | Zhou et al. |
| 2021/0288709 A1* | 9/2021 | Berger ................. H04B 7/0671 |

OTHER PUBLICATIONS

International Search Report and Written Opinion of the International Searching Authority dated Oct. 1, 2021 in connection with International Application No. PCT/KR2021/008702, 7 pages.

Nict, "Power control for UL configured grant (CG) transmission," R1-1906117, 3GPP TSG RAN WG1 #97, Reno, Nevada, USA, May 13-17, 2019, 3 pages.

* cited by examiner

HYBRID HIERARCHICAL PARAMETER TRACKING FOR CSI ESTIMATION

CROSS-REFERENCE TO RELATED APPLICATIONS AND CLAIM OF PRIORITY

The present application claims priority to:
U.S. Provisional Patent Application No. 63/053,463, filed on Jul. 17, 2020;
U.S. Provisional Patent Application No. 63/119,426, filed on Nov. 30, 2020;
U.S. Provisional Patent Application No. 63/161,695, filed on Mar. 16, 2021; and
U.S. Provisional Patent Application No. 63/170,278, filed on Apr. 2, 2021. The contents of the above-identified patent documents are incorporated herein by reference.

TECHNICAL FIELD

The present disclosure relates generally to wireless communication systems and, more specifically, the present disclosure relates to hybrid hierarchical parameter tracking for channel state information (CSI) estimation in communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to hybrid hierarchical parameter tracking for CSI estimation in communication systems.

In one embodiment, a base station (BS) is provided. The BS comprises a transceiver configured to receive uplink signals comprising a CSI report or a sounding reference signal (SRS). The Bs further comprises a processor operably connected to the transceiver, the processor configured to: perform a channel parameter tracking operation to determine channel parameters that change less than a first threshold amount based on the received uplink signals; perform a channel parameter prediction operation to determine the channel parameters that change greater than a second threshold amount on an output of the channel parameter tracking operation; and perform a channel prediction operation for downlink channels based on an output of the channel parameter tracking operation and the channel parameter prediction operation.

In another embodiment, a method of a BS is provided. The method comprising: receiving uplink signals comprising a CSI report or an SRS; performing a channel parameter tracking operation to determine channel parameters that change less than a first threshold amount based on the received uplink signals; performing a channel parameter prediction operation to determine the channel parameters that change greater than a second threshold amount on an output of the channel parameter tracking operation; and performing a channel prediction operation for downlink channels based on an output of the channel parameter tracking operation and the channel parameter prediction operation.

In yet another embodiment, a non-transitory computer-readable medium is provided. The non-transitory computer-readable medium comprises program code, that when executed by at least one processor, causes a BS to: receive uplink signals comprising a CSI report or an SRS; perform a channel parameter tracking operation to determine channel parameters that change less than a first threshold amount based on the received uplink signals; perform a channel parameter prediction operation to determine the channel parameters that change greater than a second threshold amount on an output of the channel parameter tracking operation; and perform a channel prediction operation for downlink channels based on an output of the channel parameter tracking operation and the channel parameter prediction operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
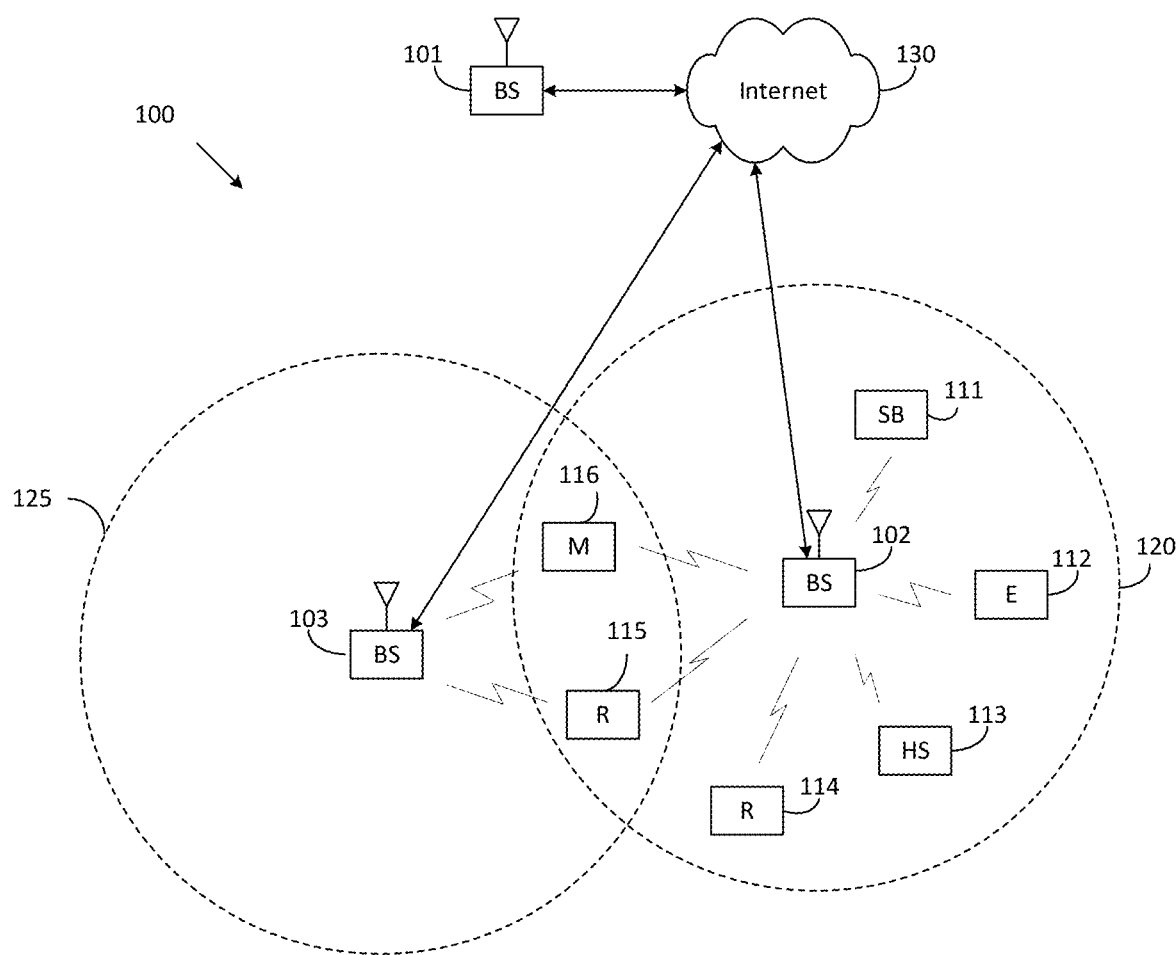
FIG. 1 illustrates an example wireless network according to embodiments of the present disclosure.
Figure 2:
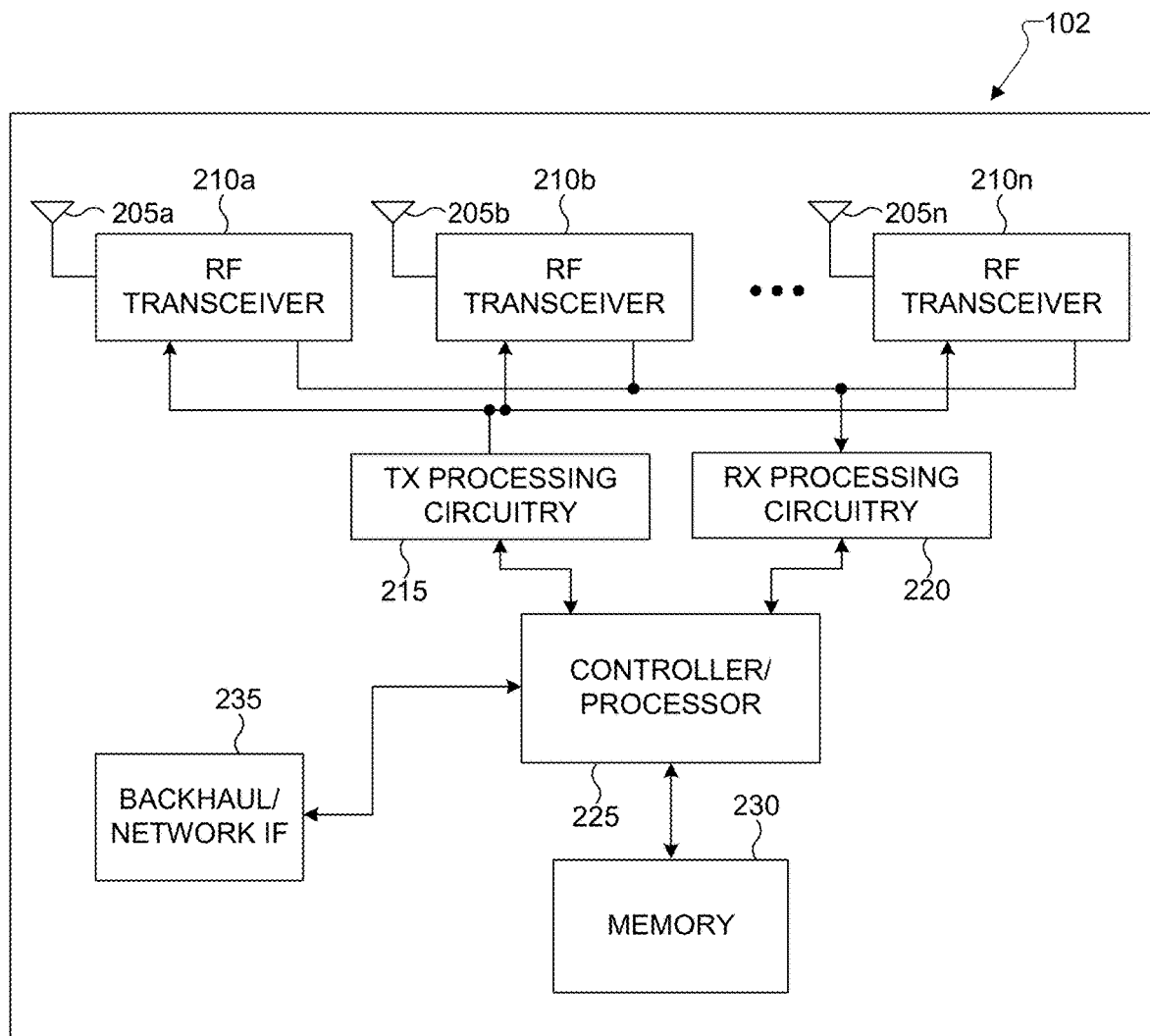
FIG. 2 illustrates an example gNB according to embodiments of the present disclosure.
Figure 3:
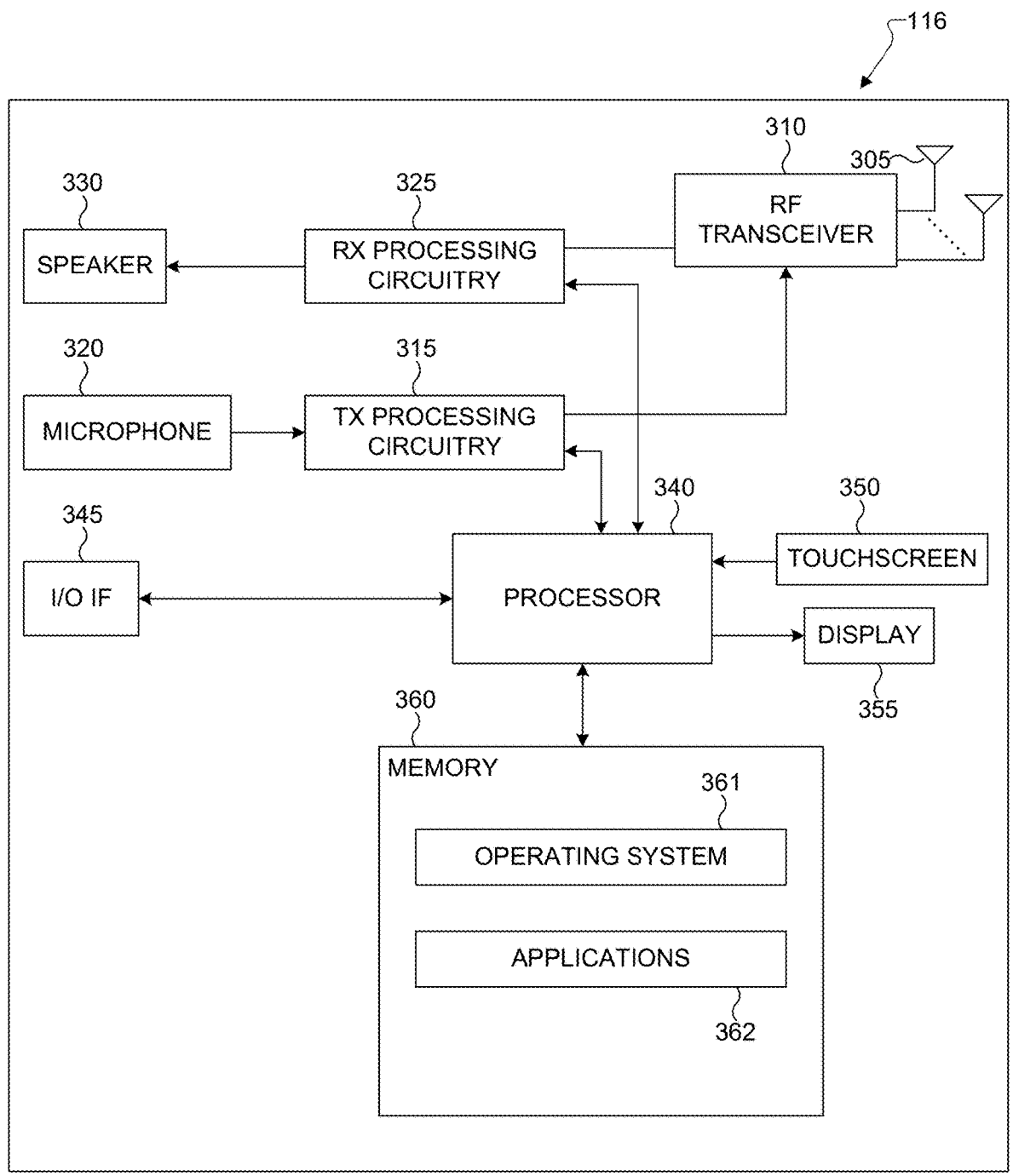
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "gNB" can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for hybrid hierarchical parameter tracking for CSI estimation in a wireless communication system. In certain embodiments, and one or more of the gNBs 101-103 includes circuitry, programing, or a combination thereof, for hybrid hierarchical parameter tracking for CSI estimation in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support hybrid hierarchical parameter tracking for CSI estimation in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for hybrid hierarchical parameter tracking for CSI estimation in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB.

Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
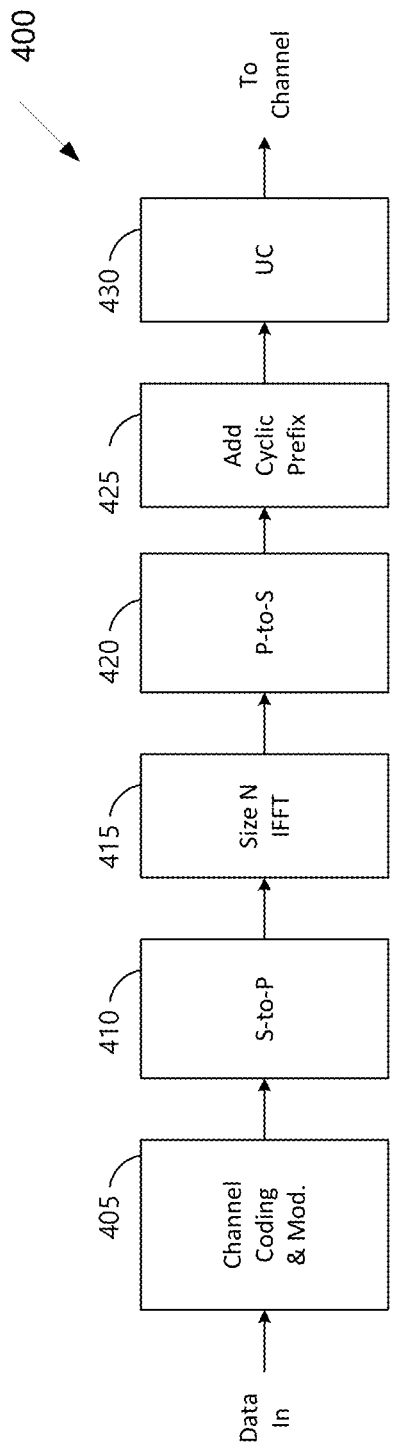
FIGS. 4 and 5 illustrate example wireless transmit and receive paths according to this disclosure.
Figure 5:
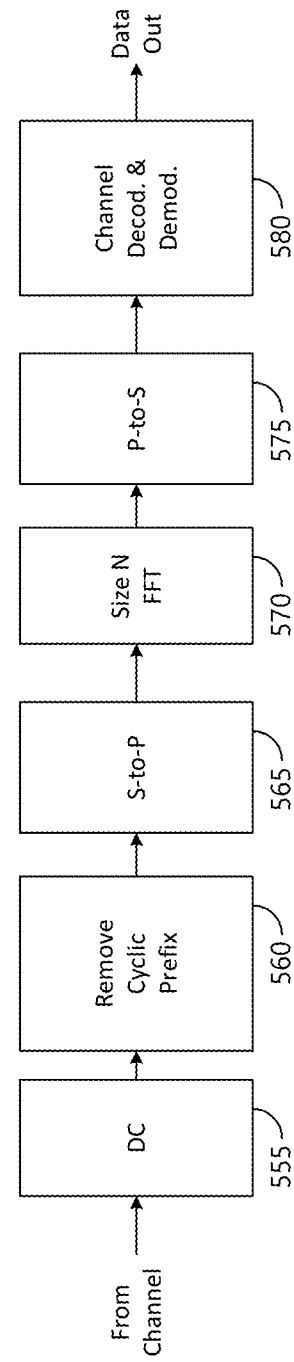

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
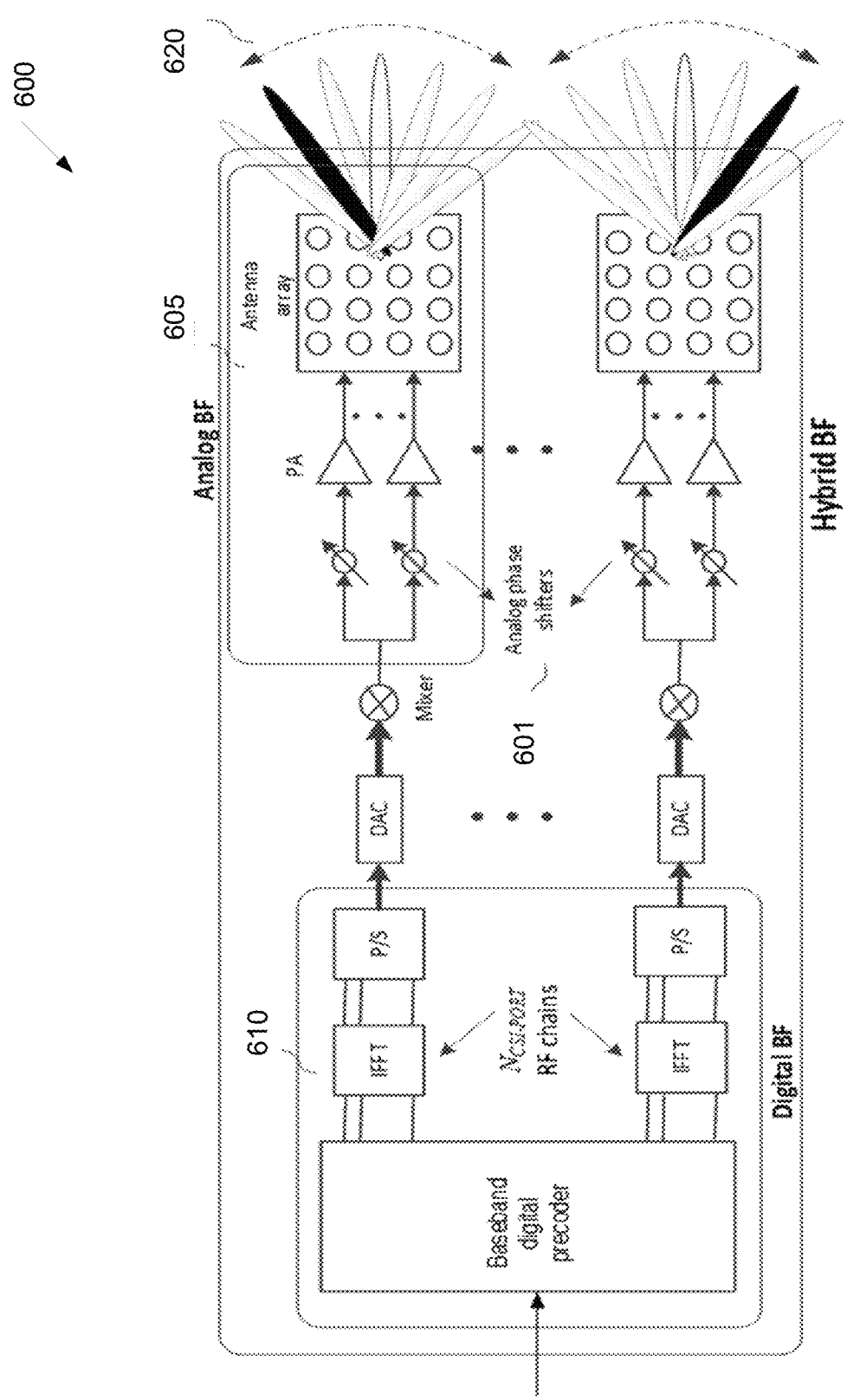
FIG. 6 illustrates an example beamforming architecture according to embodiments of the present disclosure.

FIG. 6 illustrate an example beamforming architecture 600 according to embodiments of the present disclosure. An embodiment of the beamforming architecture 600 shown in FIG. 6 is for illustration only.

For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts (ADCs)/digital-to-analog converts (DACs) at mmWave frequencies) as illustrated by beamforming architecture 600 in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes or slots (wherein a subframe or a slot comprises a collection of symbols and/or can comprise a transmission time interval).

The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Figure 7:
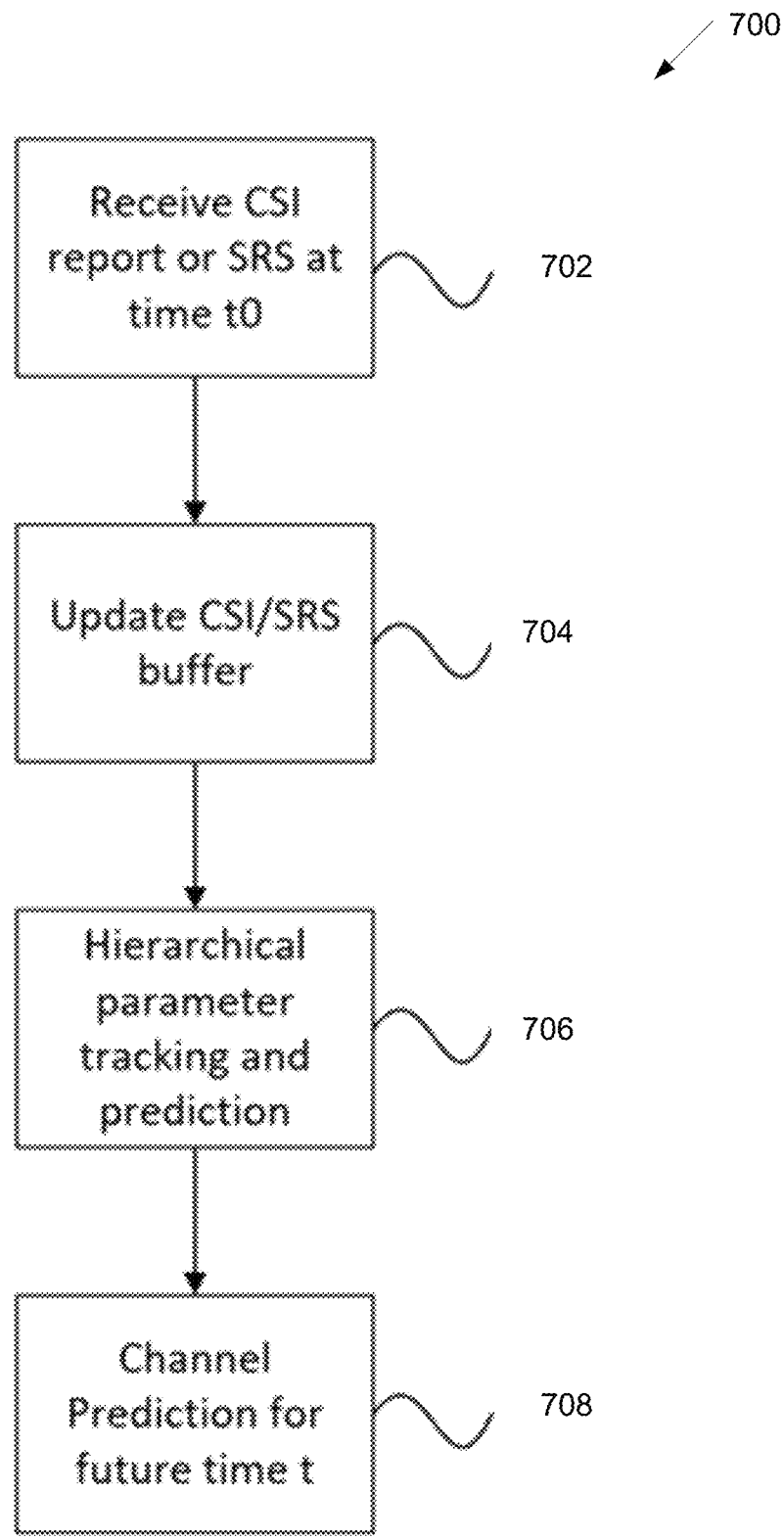
FIG. 7 illustrates a flowchart of a method of base station for a channel prediction operation according to embodiments of the present disclosure.

FIG. 7 illustrate a flowchart of a method 700 of base station for a channel prediction operation according to embodiments of the present disclosure. The method 700 may be performed by a base station (e.g., 101-103 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

The present disclosure provides a new channel tracking and prediction method and apparatus for massive MIMO (mMIMO) CSI acquisitions. One or more embodiments include a buffer that stores past uplink channel estimates, a parameter estimation module and a channel prediction module. FIG. 7 illustrates the structure of the present disclosure.

As illustrated in FIG. 7, at operation 702, a BS receives a CSI report or sounding reference signal (SRS) measurement from a UE at time $t_0$. At operation 704, the BS updates buffer by storing the new information. Certain channel parameters are updated in operation 706 by utilizing both past and new information. At operation 708, the updated parameters are used to derive the future channel response.

In time division duplexing (TDD) mMIMO systems, one method for a BS to obtain DL CSI is to utilize channel reciprocity. The predicted DL channel can be used by other functional blocks in the BS to improve system performance. For example, it helps the scheduler optimize resource allocation between different UEs, and increase the accuracy of DL precoder and performance of DL MU-MIMO transmission by reducing the inter-user interference.

The present disclosure provides details about operation 706 and 708 in FIG. 7. The channel prediction parameters are updated upon a BS receiving new CSI report or SRS measurements. One embodiment of this present disclosure adopts a multipath channel model, where the time-frequency channel response h(t, f) is modeled as a sum of contributions from several multipath components (MPC). The model assumes the channel is constructed on a sum of basis waveforms. P sinusoidal waveforms indexed by p=1, 2, . . . , P is used.

Waveform p is parameterized by signal delays $\tau_p$, which spans both the frequency domain. The channel variation over time are captured by time-varying complex coefficients $\gamma(t)$. Then, the channel at time t and frequency f on antenna k is a linear combination of the P basis waveforms:

$$h_k(t, f) = \sum_{p=1}^{P} \gamma_{k,p}(t) e^{-j2\pi f \tau_p}.$$

The parameter set in this embodiment is antenna-dependent path weight $\{\gamma_{k,p}(t)\}$, path delay $\{\tau_p\}$. In this embodiment, $\gamma(t)$ is assumed to follow an autoregressive model with order d. Assuming the SRS update interval is $T_0$, the autoregressive (AR) model can be expressed:

$$\gamma_{k,p}(t + T_0) = \sum_{i=0}^{d-1} \beta_{i,p} \gamma_{k,p}(t - iT_0).$$

Where $\{\beta_{i,p}\}$ are coefficients of the AR model. Both path delay $\{\tau_p\}$ and AR coefficients $\{\beta_{i,p}\}$ are considered antenna independent, which greatly reduces the model complexity and estimation accuracy. These are valid assumptions for the BS with a large number of antennas, because path delay as well as the channel time correlation are treated as channel large-scale parameters, which are shared among different BS antennas.

One embodiment of operation 706 uses two-layer hierarchical channel parameter prediction, and the operation 706 includes one layer for channel parameter tracking and the other for channel parameter prediction. One embodiment of this two-layer hierarchical processing is outlined in FIG. 8, where two layers operate sequentially and the second layer takes output from the first layer.

Figures 8, 9:
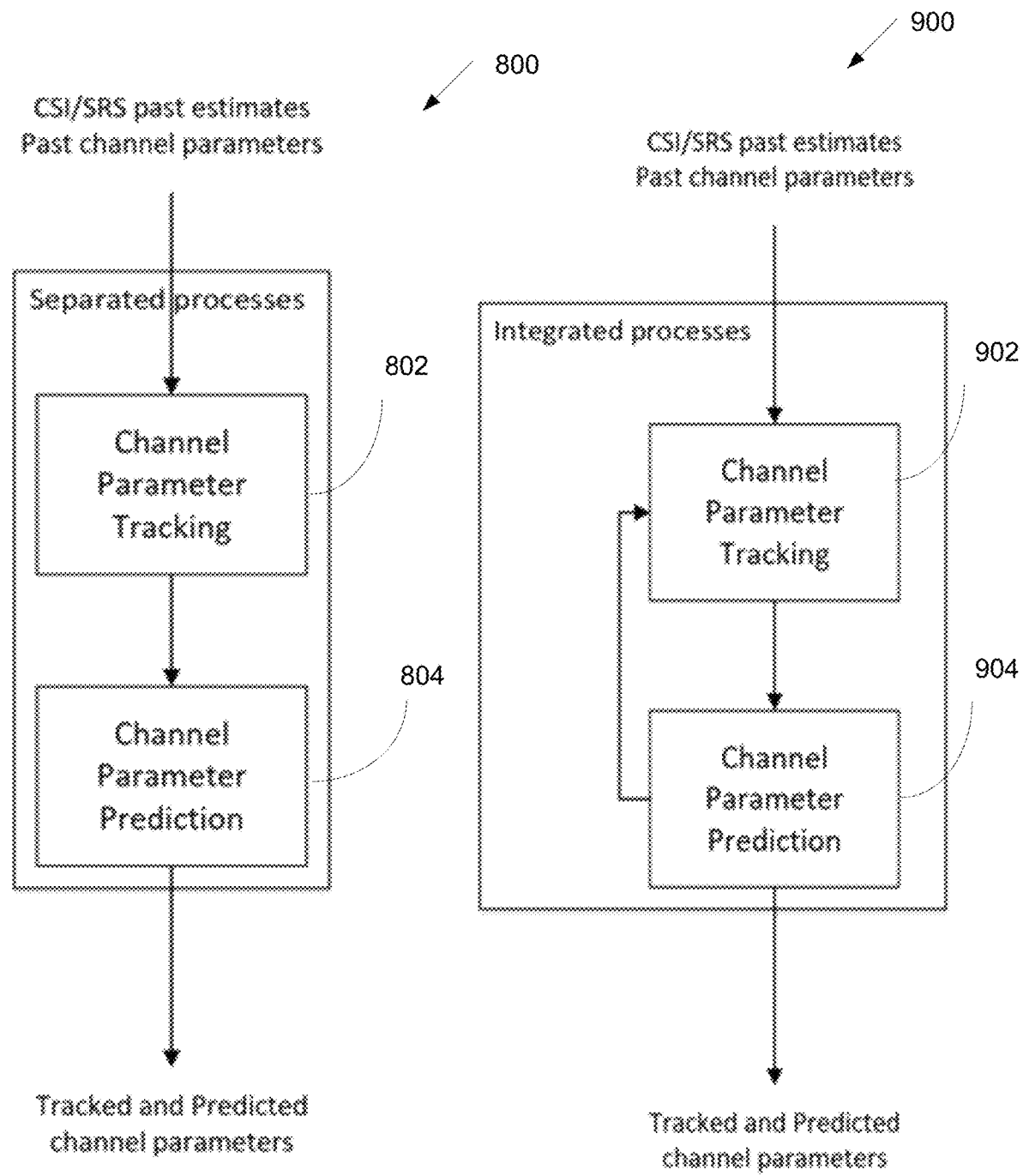
FIG. 8 illustrates a flowchart of a method of a base station for a two-layer hierarchical processing according to embodiments of the present disclosure.
FIG. 9 illustrates another flowchart of a method of a base station for a two-layer hierarchical processing according to embodiments of the present disclosure.

FIG. 8 illustrates a flowchart of a method 800 of a base station for a two-layer hierarchical processing according to embodiments of the present disclosure. The method 800 may be performed by a base station (e.g., 101-103 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, at step 802, the method 800 performs a channel parameter tracking operation and the method 800 performs a channel parameter prediction at step 804.

FIG. 9 illustrates another flowchart of a method 900 of a base station for a two-layer hierarchical processing according to embodiments of the present disclosure. The method 900 may be performed by a base station (e.g., 101-103 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

Another embodiment of this two-layer hierarchical processing is an integrated structure in FIG. 9, which adds feedback parameters from the second layer back to the first layer. This hierarchical structure is useful to decouple channel parameter. In one embodiment, the first layer estimates and tracks slow time-varying parameters while the second layer predicts fast time-varying parameters.

As illustrated in FIG. 9, the method 900 performs a channel parameter tracking operation at step 902 and performs a channel parameter prediction at step 904.

Figure 10:
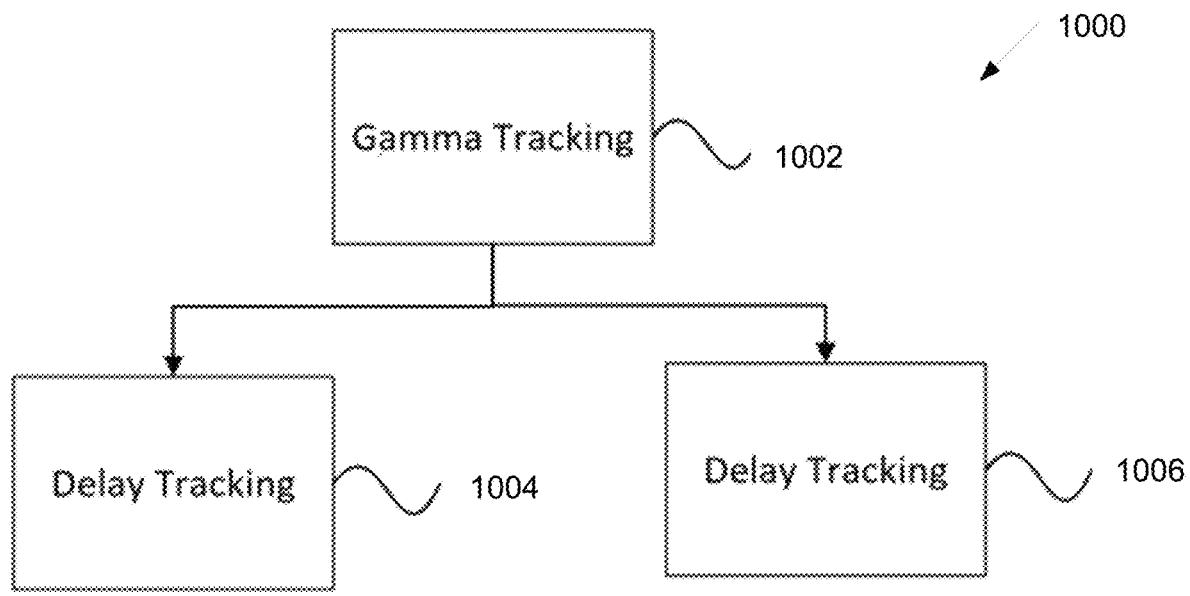
FIG. 10 illustrates an example tracking operation according to embodiments of the present disclosure.

One embodiment of operation 706 in FIG. 7 is a sequential parameter update operation for path delay, path weights, and linear prediction (LP) coefficients. As shown in FIG. 10. The inputs are previous path weights (gamma), path delay, LP coefficients and updated SRS buffer. In this embodiment, the parameter update sequence is to perform gamma tracking first, next delay tracking, and LP coefficients update, corresponding to operations 1002, 1004, and 1006 in FIG. 10.

FIG. 10 illustrates an example tracking operation 1000 according to embodiments of the present disclosure. An embodiment of the tracking operation 1000 shown in FIG. 10 is for illustration only.

For a Gamma tracking operation (e.g., operation 1002 as illustrated in FIG. 10), one embodiment is to use the parameter filtering method, which follows the Kalman filter (KF) framework. The update is performed per antenna basis for the P tracked paths concurrently. Denote $\gamma_k(n) = [\gamma_{k,1} \ldots \gamma_{k,P}]^T$ the path weights at SRS capture instance n for antenna k. Gauss-Markov model may be assumed for path weight evaluation: $\gamma_k(n) = A_\gamma \cdot \gamma_k(n-1) + B_\gamma \cdot u(n)$, where $A_\gamma$ and $B_\gamma$ are fixed matrices of dimension P×P and are common to all antennas. For simplicity and robustness, it may be assumed that the state noise u(n) is independent from SRS capture to capture and is uncorrelated among paths, e.g., $u(n) \sim N(0, \sigma_u^2 I)$. Note that in practice, u(n) can be correlated in both time and path, since it is a combined effect of dense multipath components (DMC) that are not captured in the tracked paths.

For a delay tracking (e.g., operation 1004 as illustrated in FIG. 10), the new information along with the prior knowledge about the channel parameters such as path delay and path weights are combined to update path delay. One embodiment of delay update is an EKF-based estimation framework. A dynamic state space model is assumed for path delay, where it is assumed that the dynamic state space model follows a random walk process and it is perturbed by i.i.d. random Gaussian noise $w_{\tau,n}$ at each time instant: $\tau_n = \tau_{n-1} + w_{\tau,n}$.

The observation equation uses the following the signal model: $y_{srs} = s(\tau, \Gamma) + n_0$. If path Doppler v and path weights $\Gamma$ are fixed, there is a nonlinear mapping from path delay $\tau$ to the observation vector. A traditional KF may not work with a nonlinear observation equation, and one has to rely on an extended Kalman filter (EKF) to linearize the observation equation around the predicted values of the state vector. The path weight matrix $\Gamma$ can be constructed by stacking path weight vector $\gamma_k^T$ for k-th antenna in the row direction, which has a dimension of $N_{ant} \times P$:

$$\Gamma = \begin{bmatrix} \gamma_1^T \\ \vdots \\ \gamma_{N_{ant}}^T \end{bmatrix}.$$

In the delay tracking/update function block (e.g., operation 1004 in FIG. 10), the state vector includes path delays $\tau$ from P paths. At n-th time instant, the inputs to this function block are previous path delays $\tau_{n-1}$, prior error covariance matrix $P_{\tau,n-1}$, updated path weights $\Gamma_n$ and previous path Doppler $v_{n-1}$. The outputs of this function block are updated path delays $\tau_n$ and error covariance matrix $P_{\tau,n}$.

For the updates of LP coefficients (e.g., operation 1006 in FIG. 10), one embodiment uses the recursive least square (RLS) method. For each path, LP coefficients of each path are updated based on a regularized least square with a regularization factor $\alpha$. Both the correlation matrix and the cross-correlation vector are updated using an infinite impulse response (IIR) filter with the parameter $\lambda$. Both the correlation matrix and the cross-correlation vector may use new and past Gamma estimates from the operation 1002. The main steps of LP coefficients update are summarized below.

First, the IIR filtered covariance matrix is calculated as follows: $P_n = \lambda P_{n-1} + (1-\lambda)\Gamma_L \Gamma_L^H$. Secondly, an IIR filtered cross-correlation vector is calculated as follows: $z_n = \lambda z_{n-1} + (1-\lambda)(\Gamma_L \gamma^*)$. Finally, the new coefficients are calculated as follows: $\beta_n = (P_n + \alpha P_n[0,0]I)^{-1} z_n$.

Figure 11:
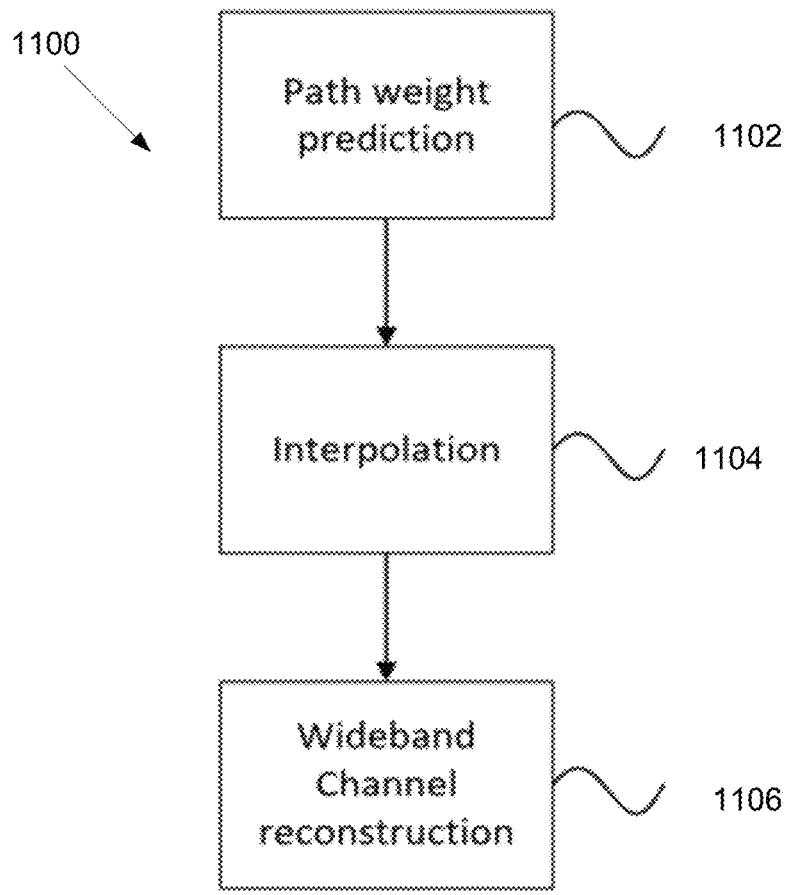
FIG. 11 illustrates a flowchart of a method of a base station for channel prediction step according to embodiments of the present disclosure.

For the channel prediction step (e.g., operation 708 in FIG. 7), one embodiment uses the following operation flowchart outlined in FIG. 11. The channel prediction step includes three main steps, path weight prediction (operation 1102), path weight interpolation (operation 1104) and wideband channel reconstruction (operation 1106).

FIG. 11 illustrates a flowchart of a method 1100 of a base station for channel prediction step according to embodiments of the present disclosure. The method 1100 may be performed by a base station (e.g., 101-103 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

For the path weight prediction (e.g., operation 1102), one embodiment uses the estimated LP coefficients and history of gamma estimates and predict gamma at next SRS update for each path, when $t = (n+1)T_0$ and the current time is $$t = nT_0, \hat{\gamma}_{k,p}((n+1)T_0) = \sum_{i=0}^{d-1} \beta_{i,p} \gamma_{k,p}((n-i)T_0).$$

If path weight prediction is needed for $t = (n+2)T_0$, $(n+3)T_0$ or more, a recursive prediction method is used.

For the path weight interpolation (e.g., operation 1104) when $nT_0 < t < (n+1)T_0$, one embodiment is to use a linear interpolation:

$$\hat{\gamma}_{k,p}(t) = \frac{t - nT_0}{T_0} \gamma_{k,p}(nT_0) + \frac{(n+1)T_0 - t}{T_0} \hat{\gamma}_{k,p}((n+1)T_0).$$

For the wideband channel reconstruction (e.g., operation 1106), one embodiment uses the path delay and predicted path weights to calculate the wideband channel frequency response for each antenna:

$$\hat{h}_k(t, f) = \sum_{p=1}^{P} \hat{\gamma}_{k,p}(t) e^{-j2\pi f \tau_p}.$$

In one embodiment, as shown in FIG. 10, the linearly predicted gamma is only used for channel reconstruction but not used for other tracking modules, such as gamma tracking, delay tracking and Doppler tracking.

Figure 12:
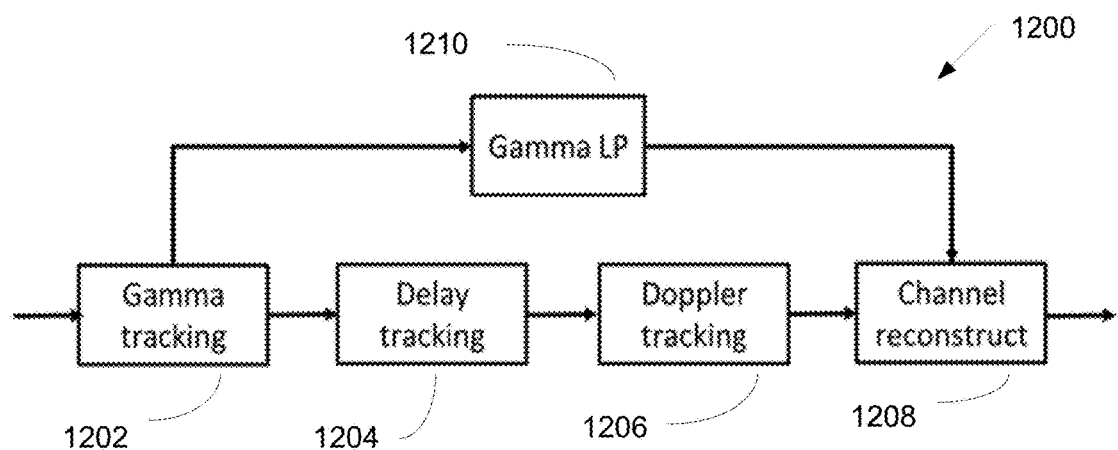
FIG. 12 illustrates a flowchart of a method of a base station for channel prediction and reconstruction according to embodiments of the present disclosure.

FIG. 12 illustrates a flowchart of a method 1200 of a base station for channel prediction and reconstruction according to embodiments of the present disclosure. The method 1200 may be performed by a base station (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 performs a Gamma tracking operation at step 1202, a delay tracking operation at step 1204, a Doppler tracking operation at step 1206, a channel reconstruct operation at step 1208, and a Gamma LP operation at step 1210. The output of the Gamma tracking operation is transferred to the Gamma LP operation. The output of the Gamma LP operation is transferred to the channel reconstruct operation.

Figure 13:
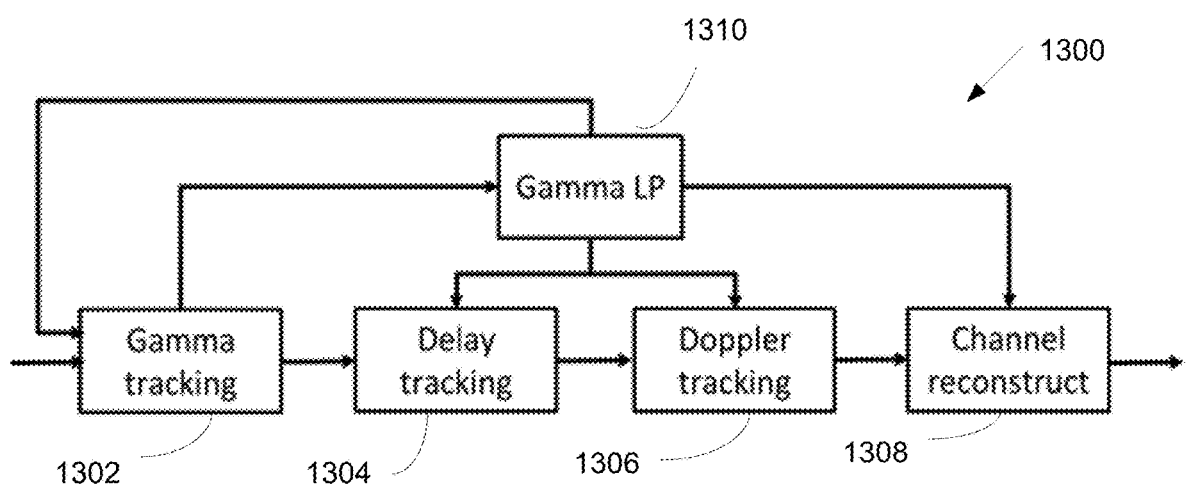
FIG. 13 illustrates a flowchart of a method of a base station for channel prediction and reconstruction according to embodiments of the present disclosure.

FIG. 13 illustrates a flowchart of a method 1300 of a base station for channel prediction and reconstruction according to embodiments of the present disclosure. The method 1300 may be performed by a base station (e.g., 101-103 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one embodiment, as shown in FIG. 11, the linearly predicted gamma is used for channel reconstruction as well as some of the tracking modules, such as delay tracking and/or Doppler tracking to further improve the module tracking performance.

As illustrated in FIG. 13, the method 1300 performs a Gamma tracking operation at step 1302, a delay tracking operation at step 1304, a Doppler tracking operation at step 1306, a channel reconstruct operation at step 1308, and a Gamma LP operation at step 1310. The output of the Gamma tracking operation is transferred to the Gamma LP operation. The output of the Gamma LP operation is transferred to the channel reconstruct operation. Specifically, an output of the Gamma LP operation provide a feedback to the Gamma tracking operation.

Figure 14:
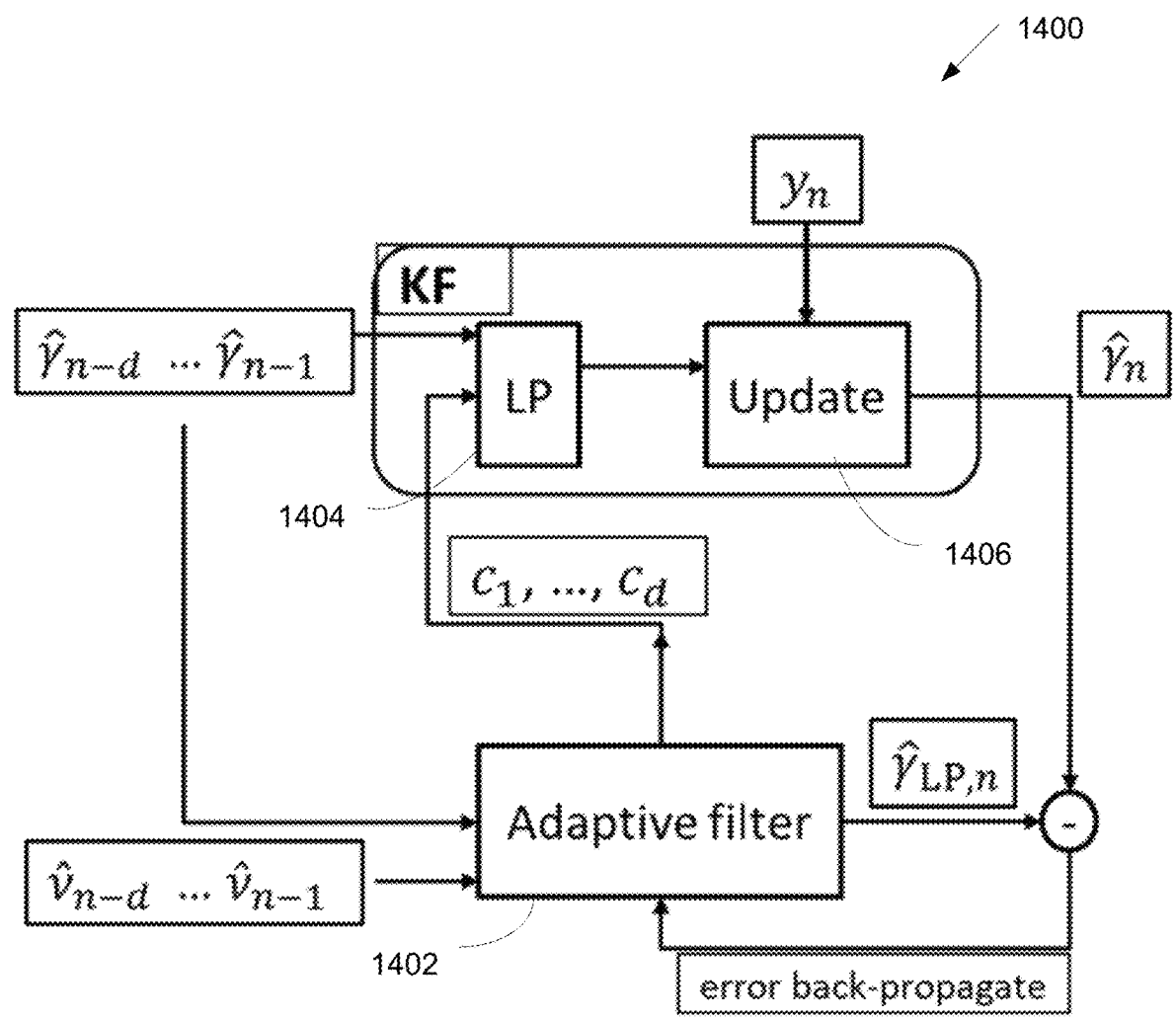
FIG. 14 illustrates a method for a gamma tracking operation according to embodiments of the present disclosure.

In another embodiment, the LP gamma is integrated with gamma tracking as shown in FIG. 14.

FIG. 14 illustrates a method 1400 for gamma tracking operation according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, during a gamma prediction step, multi-step prediction for gamma state transition is used.

As illustrated in FIG. 14, the method 1400 performs an adaptive filter operation at step 1402, an LP operation at step 1404, and an updating operation at step 1406 based on the output from the LP.

The step for state vector prediction is given as: $\gamma_{n|n-1} = \beta_1 \gamma_{n-1} + \beta_2 \gamma_{n-2} + \ldots$.

The step to compute state vector prediction error covariance is given as: $M_{n|n-1} = \beta_1 M_{n-1}(\beta_1)^H + \beta_2 M_{n-2}(\beta_2)^H + \ldots$.

An alternative view from augmented gamma Kalman tracking is given as:

$$\begin{bmatrix} \gamma_n \\ \gamma_{n-1} \end{bmatrix} = \begin{bmatrix} \beta_1 & \beta_2 \\ I & 0 \end{bmatrix} \begin{bmatrix} \gamma_{n-1} \\ \gamma_{n-2} \end{bmatrix} + \begin{bmatrix} I \\ 0 \end{bmatrix} w_n.$$

In one embodiment, $\beta_i$ in the above formulation is estimated by RLS or minimum mean square error (MMSE) estimator during run-time.

In one embodiment, the channel state information prediction may be performed using information extracted from both SRS and UE feedback report such as channel quality indication (CQI), rank indication (RI), and precoding matrix indication (PMI).

In one example, the channel state information prediction automatically selects PMI feedback for predicted channels if SRS SNR is less than a threshold.

In a second example, predicted channel includes a weighted sum of channel reconstructed from PMI and predicted from SRS, where the weight is determined by the SRS SNR.

In a third example, the wideband PMI feedback (e.g., W1) is used to form a spatial correlation matrix that can be further used in SRS based tracking, where the spatial correlation matrix can be used as a decomposition basis for SRS channel estimation in antenna domain.

In a fourth example, the subband CQI can be used to calibrate the path weight gain predicted from SRS at different subband, where the calibration can be either use CQI to substitute the original path weight or put a weight on the original path estimate.

In one embodiment, the further RLS processing and prediction of gamma is dynamically turned on and off. The RLS processing and prediction of gamma is turned on if at least one of or a combination of the following conditions met: (1) previously prediction performance measured by prediction error being smaller than a threshold. (2) negative acknowledgement (NACK) or block error rate (BLER) is less than a threshold (3) modulation coding scheme (MCS) level is maintained above a certain level and not fluctuating more than a threshold over a certain time window.

In another embodiment, the further RLS processing and prediction of gamma is dynamically turned on and off by comparing two prediction performance hypotheses. In one hypothesis, the prediction error is calculated assuming RLS gamma processing is turned off In the second hypothesis, the prediction error is calculated assuming RLS gamma processing is turned on. Then, by comparing the two errors under the two hypotheses, the one (either ON or OFF) with lower error is selected.

In another embodiment to update LP coefficients, the LP coefficients update uses the ordinary least square (OLS) method. To form a system of linear equations, a sliding window with length d in the long history of path weight (gamma) is used.

Figure 15:
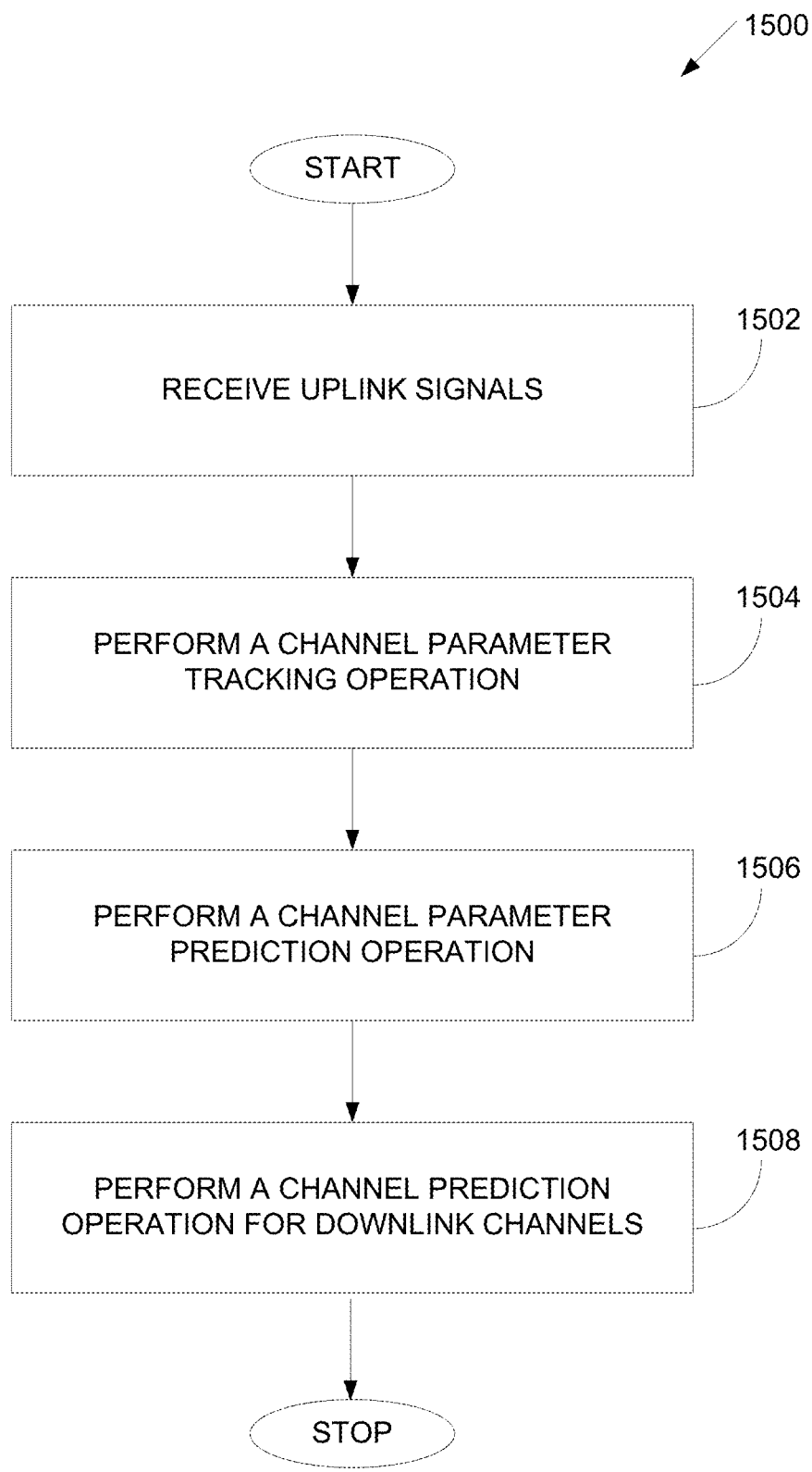
FIG. 15 illustrates a method for gamma tracking according to embodiments of the present disclosure.

FIG. 15 illustrates a flowchart of a method 1500 of a base station for hybrid hierarchical parameter tracking for CSI estimation according to embodiments of the present disclosure. The method 1500 may be performed by a base station (e.g., 101-103 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1502. At step 1502, the BS receives uplink signals comprising a CSI report or an SRS.

At step 1504, the BS performs a channel parameter tracking operation to determine channel parameters that change less than a first threshold amount based on the received uplink signals. The first threshold amount is used to determine slow time varying parameters for tracking the channel parameters. When the channel parameters are changed less than a value of the first threshold that is pre-determined as a system parameter or configured by a system, the channel parameters are determined as slow-varying parameters.

At step 1506, the BS performs a channel parameter prediction operation to determine the channel parameters that change greater than a second threshold amount on an output of the channel parameter tracking operation. The second threshold amount is used to determine fast time varying parameters for predicting the channel parameters. When the channel parameters are changed more than a value of the second threshold that is pre-determined as a system parameter or configured by a system, the channel parameters are determined as fast-varying parameters.

At step 1508, the BS performs a channel prediction operation for downlink channels based on an output of the channel parameter tracking operation and the channel parameter prediction operation. At step 1508, the BS may generate the predicted channel for the downlink channels based on the channel prediction operation. The predicted channel that is generated in step 1508 may be a reference channel to estimate and predict the downlink channel. In one embodiment, the predicted channel comprises a weighted sum of channel reconstructed from PMI and predicted from SRS. In such embodiment, the weighted sum is determined by the SRS SNR.

In one embodiment, the BS performs a hierarchical channel parameter tracking and prediction operation such that the output from the channel parameter prediction operation is used as input parameters to perform the channel parameter tracking operation.

In one embodiment, the BS performs a channel reconstruction operation to perform the channel prediction operation based on results of the channel parameter tracking operation and the channel parameter prediction operation. In such embodiment, the channel parameter tracking operation comprises a gamma tracking operation, a delay tracking operation, and a Doppler tracking operation and the channel parameter prediction operation comprises a gamma LP operation.

In one embodiment, the BS identifies periodic SRS parameters of the SRS to use as an input for the gamma tracking operation, identifies gamma parameters output from the gamma tracking operation to use as an input for the gamma LP operation and the delay tracking operation, and identifies gamma LP parameters output from the gamma LP operation, delay parameters output from the delay tracking operation, and Doppler parameters output from the Doppler tracking operation to use as inputs for the channel reconstruction operation, the Doppler parameters generated based on the delay parameters output from the delay tracking operation.

In one embodiment, the BS identifies periodic SRS parameters of the SRS to use as an input for the gamma tracking operation, identifies gamma parameters output from the gamma tracking operation to use as an input for the gamma LP operation and the delay tracking operation, identifies delay tracking parameters output from the delay tracking operation to use as an input for the Doppler tracking operation, identifies gamma LP parameters output from the gamma LP operation to use as an input for the gamma tracking operation, the delay tracking operation, and the Doppler tracking operation, and performs the channel reconstruction operation to perform the channel prediction operation based on results of the gamma LP operation, the delay tracking operation, and the Doppler tracking operation.

In one embodiment, the BS performs an SRS based prediction operation based on a CSI-RS report and the SRS and performs the channel prediction operation for the downlink channels based on the SRS based prediction operation.

In one embodiment, the BS performs the SRS based prediction operation to perform the channel prediction operation based on information of a PMI feedback to form a spatial correlation matrix to use as a decomposition basis for SRS channel estimation in an antenna domain or performs the SRS based prediction operation to perform the channel prediction operation based on information of subband CQI to calibrate a path weight gain at a different subband.

In one embodiment, the BS performs a prediction fusion operation based on a CSI-RS report and predicted SRS obtained from an SRS based prediction operation and performs the channel prediction operation based on the prediction fusion operation.

In one embodiment, the BS performs the prediction fusion operation to perform the channel prediction operation based on information of a PMI feedback if an SRS-SNR is less than a pre-determined threshold, the PMI feedback being automatically selected as a result of the prediction fusion operation, or performing the prediction fusion operation to perform the channel prediction operation based on the information of the PMI feedback and the predicted SRS obtained from the SRS based prediction operation, the predicted downlink channels comprising a weighted sum of channels reconstructed from the PMI feedback and the predicted SRS.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) comprising:
   a transceiver configured to receive uplink signals comprising a channel state information (CSI) report or a sounding reference signal (SRS); and
   a processor operably connected to the transceiver, the processor configured to:
      perform a channel parameter tracking operation to determine channel parameters that change less than a first threshold amount based on the received uplink signals;
      perform a channel parameter prediction operation to determine the channel parameters that change greater than a second threshold amount on an output of the channel parameter tracking operation; and
      perform a channel prediction operation for downlink channels based on an output of the channel parameter tracking operation and the channel parameter prediction operation.

2. The BS of claim 1, wherein the processor is further configured to perform a hierarchical channel parameter tracking and prediction operation such that the output from the channel parameter prediction operation is used as input parameters to perform the channel parameter tracking operation.

3. The BS of claim 1, wherein:
   the channel parameter tracking operation comprises a gamma tracking operation, a delay tracking operation, and a Doppler tracking operation,
   the channel parameter prediction operation comprises a gamma linear prediction (LP) operation, and the processor is further configured to perform a channel reconstruction operation to perform the channel prediction operation based on results of the channel parameter tracking operation and the channel parameter prediction operation.

4. The BS of claim 3, wherein the processor is further configured to:
 identify periodic SRS parameters of the SRS to use as an input for the gamma tracking operation;
 identify gamma parameters output from the gamma tracking operation to use as an input for the gamma LP operation and the delay tracking operation; and
 identify gamma LP parameters output from the gamma LP operation, delay parameters output from the delay tracking operation, and Doppler parameters output from the Doppler tracking operation to use as inputs for the channel reconstruction operation, the Doppler parameters generated based on the delay parameters output from the delay tracking operation.

5. The BS of claim 3, wherein the processor is further configured to:
 identify periodic SRS parameters of the SRS to use as an input for the gamma tracking operation;
 identify gamma parameters output from the gamma tracking operation to use as an input for the gamma LP operation and the delay tracking operation;
 identify delay tracking parameters output from the delay tracking operation to use as an input for the Doppler tracking operation;
 identify gamma LP parameters output from the gamma LP operation to use as an input for the gamma tracking operation, the delay tracking operation, and the Doppler tracking operation; and
 perform the channel reconstruction operation to perform the channel prediction operation based on results of the gamma LP operation, the delay tracking operation, and the Doppler tracking operation.

6. The BS of claim 1, wherein the processor is further configured to:
 perform an SRS based prediction operation based on a CSI-reference signal (CSI-RS) report and the SRS; and
 perform the channel prediction operation for the downlink channels based on the SRS based prediction operation.

7. The BS of claim 6, wherein the processor is further configured to:
 perform the SRS based prediction operation to perform the channel prediction operation based on information of a precoding matrix indicator (PMI) feedback to form a spatial correlation matrix to use as a decomposition basis for SRS channel estimation in an antenna domain; or
 perform the SRS based prediction operation to perform the channel prediction operation based on information of subband channel quality indictor (CQI) to calibrate a path weight gain at a different subband.

8. The BS of claim 1, wherein:
 the processor is further configured to perform a prediction fusion operation based on a CSI-RS report and predicted SRS obtained from an SRS based prediction operation; and
 perform the channel prediction operation based on the prediction fusion operation.

9. The BS of claim 8, wherein the processor is further configured to:
 perform the prediction fusion operation to perform the channel prediction operation based on information of a PMI feedback if an SRS signal-to-noise ratio (SRS-SNR) is less than a pre-determined threshold, the PMI feedback being automatically selected as a result of the prediction fusion operation, or
 perform the prediction fusion operation to perform the channel prediction operation based on the information of the PMI feedback and the predicted SRS obtained from the SRS based prediction operation, the predicted downlink channels comprising a weighted sum of channels reconstructed from the PMI feedback and the predicted SRS.

10. A method of a base station (BS), the method comprising:
 receiving uplink signals comprising a channel state information (CSI) report or a sounding reference signal (SRS);
 performing a channel parameter tracking operation to determine channel parameters that change less than a first threshold amount based on the received uplink signals;
 performing a channel parameter prediction operation to determine the channel parameters that change greater than a second threshold amount on an output of the channel parameter tracking operation; and
 performing a channel prediction operation for downlink channels based on an output of the channel parameter tracking operation and the channel parameter prediction operation.

11. The method of claim 10, further comprising performing a hierarchical channel parameter tracking and prediction operation such that the output from the channel parameter prediction operation is used as input parameters to perform the channel parameter tracking operation.

12. The method of claim 10, further comprising performing a channel reconstruction operation to perform the channel prediction operation based on results of the channel parameter tracking operation and the channel parameter prediction operation,
 wherein:
  the channel parameter tracking operation comprises a gamma tracking operation, a delay tracking operation, and a Doppler tracking operation; and
  the channel parameter prediction operation comprises a gamma linear prediction (LP) operation.

13. The method of claim 12, further comprising:
 identifying periodic SRS parameters of the SRS to use as an input for the gamma tracking operation;
 identifying gamma parameters output from the gamma tracking operation to use as an input for the gamma LP operation and the delay tracking operation; and
 identifying gamma LP parameters output from the gamma LP operation, delay parameters output from the delay tracking operation, and Doppler parameters output from the Doppler tracking operation to use as inputs for the channel reconstruction operation, the Doppler parameters generated based on the delay parameters output from the delay tracking operation.

14. The method of claim 12, further comprising:
 identifying periodic SRS parameters of the SRS to use as an input for the gamma tracking operation;
 identifying gamma parameters output from the gamma tracking operation to use as an input for the gamma LP operation and the delay tracking operation;
 identifying delay tracking parameters output from the delay tracking operation to use as an input for the Doppler tracking operation;
 identifying gamma LP parameters output from the gamma LP operation to use as an input for the gamma tracking operation, the delay tracking operation, and the Doppler tracking operation; and performing the channel reconstruction operation to perform the channel prediction operation based on results of the gamma LP operation, the delay tracking operation, and the Doppler tracking operation.

15. The method of claim 10, further comprising:

performing an SRS based prediction operation based on a CSI-reference signal (CSI-RS) report and the SRS; and performing the channel prediction operation for the downlink channels based on the SRS based prediction operation.

16. The method of claim 15, further comprising:

performing the SRS based prediction operation to perform the channel prediction operation based on information of a precoding matrix indicator (PMI) feedback to form a spatial correlation matrix to use as a decomposition basis for SRS channel estimation in an antenna domain; or performing the SRS based prediction operation to perform the channel prediction operation based on information of subband channel quality indictor (CQI) to calibrate a path weight gain at a different subband.

17. The method of claim 10, further comprising:

performing a prediction fusion operation based on a CSI-RS report and predicted SRS obtained from an SRS based prediction operation; and performing the channel prediction operation based on the prediction fusion operation.

18. The method of claim 17, further comprising:

performing the prediction fusion operation to perform the channel prediction operation based on information of a PMI feedback if an SRS signal-to-noise ratio (SRS-SNR) is less than a pre-determined threshold, the PMI feedback being automatically selected as a result of the prediction fusion operation, or performing the prediction fusion operation to perform the channel prediction operation based on the information of the PMI feedback and the predicted SRS obtained from the SRS based prediction operation, the predicted downlink channels comprising a weighted sum of channels reconstructed from the PMI feedback and the predicted SRS.

19. A non-transitory computer-readable medium comprising program code, that when executed by at least one processor, causes a base station (BS) to:

receive uplink signals comprising a channel state information (CSI) report or a sounding reference signal (SRS);

perform a channel parameter tracking operation to determine channel parameters that change less than a first threshold amount based on the received uplink signals;

perform a channel parameter prediction operation to determine the channel parameters that change greater than a second threshold amount on an output of the channel parameter tracking operation; and perform a channel prediction operation for downlink channels based on an output of the channel parameter tracking operation and the channel parameter prediction operation.

20. The non-transitory computer-readable medium of claim 19, further comprising program code, that when executed by at least one processor, causes the BS to perform a hierarchical channel parameter tracking and prediction operation such that the output from the channel parameter prediction operation is used as input parameters to perform the channel parameter tracking operation.

* * * * *